United States Patent Office 3,580,951
Patented May 25, 1971

3,580,951
PREPARATION OF FLUOROANILINES
John W. Churchill and Ehrenfreid H. Kober, Hamden, Peter H. Scott, Guilford, and Curtis P. Smith, Cheshire, Conn., assignors to Olin Mathieson Chemical Corporation
No Drawing. Filed Jan. 10, 1969, Ser. No. 790,444
Int. Cl. C07c 85/10
U.S. Cl. 260—580                                       6 Claims

ABSTRACT OF THE DISCLOSURE

Fluoroanilines are prepared by the deoxygenation and hydrofluorination of the corresponding nitrobenzenes which are reacted in anhydrous hydrogen fluoride and in an atmosphere of carbon monoxide at 0° to 230° C. under pressures of from 15 to 3000 p.s.i.a. in the presence of certain deoxygenating agents containing phosphorus or sulfur.

---

This invention relates to improvements in the direct conversion of nitrobenzenes to fluoroanilines. Catalytic hydrogenation is avoided and improved yields of fluoroanilines are obtained with less of the unfluorinated anilines.

Many of the fluoroanilines having at least one chloro, nitro or methyl substituent in the ring are known compounds and the corresponding substituted nitrobenzenes used as starting materials are also known compounds. While the method of this invention is particularly described with reference to the conversion of nitrobenzene to p-fluoroaniline, it is also useful for the preparation of the variously substituted fluoroanilines.

p-Fluoroaniline is a known compound of known utility disclosed, for example in U.S. Pat. 2,884,458. That patent also describes and claims a process for the manufacture of p-fluoroaniline by catalytic hydrogenation of nitrobenzene in anhydrous hydrogen fluoride. Further details on that process appear in J. Org. Chem. 26, 4014–7 (1961). In that catalytic hydrogenation process, considerable amounts of ordinary aniline accompany the p-fluoroaniline and are only difficultly separated therefrom. In general, from ¼ to ½ or more of the aniline product is ordinary aniline and the balance is p-fluoroaniline.

In addition, an improved process has been discovered, prior to this invention, which generally comprises reacting, at a temperature of from 0° to 230° C. under a pressure of from 15 to 3000 p.s.i.a., a mixture of a nitrobenzene, anhydrous hydrogen fluoride and a deoxygenating agent selected from the group consisting of elemental phosphorus, elemental sulfur, phosphorous trihalides, sulfur halides in which sulfur has a valence lower than 6, aryl phosphorous halides, aryl sulphenyl halides and triaryl phosphines.

One object of this invention is to improve further on the latter above-described process. Another object of this invention is to provide a simpler, cheaper and otherwise improved process for the direct conversion of nitrobenzenes to fluoroanilines. More particularly, an object of this invention is to provide an improved process resulting in a product containing less of the corresponding unfluorinated aniline as a contaminant of the product. A further object of the invention is to provide a process in which yields of fluoroanilines are improved.

The process of the present invention is an improved process for preparing a fluoroaniline. The prior process comprises heating at a temperature of from 100° to 230° C. under a pressure of 15 to 3000 p.s.i.a. a mixture of anhydrous hydrogen fluoride, a nitrobenzene selected from the group consisting of nitrobenzene and substituted nitrobenzenes having as substituent at least one of methyl, chloro and nitro substituents and a deoxygenating agent selected from the group consisting of elemental phosphorus, elemental sulfur, phosphorous trihalides, sulfur halides in which sulfur has a valence lower than 6, aryl phosphorous halides, aryl sulphenyl halides, and triaryl phosphines. The improvement of this invention comprises heating said reactants in an atmosphere containing a substantial proportion of carbon monoxide.

In the process of the present invention, carbon monoxide reduces the amount of deoxygenating agent required and is itself partially converted to carbon dioxide. Because carbon monoxide is far cheaper than the phosphorus or sulfur deoxygenating agents, the cost of the conversion is substantially reduced. Surprisingly, however, carbon monoxide alone is ineffective as a deoxygenating agent.

Advantageously the molar ratio of deoxygenating agent to the nitrobenzene compound is suitably from about 0.3:1 to 1:1. Less can be used, but the yields suffer. Preferably the molar ratio of carbon monoxide to deoxygenating agent is at least 0.5:1 and ratios up to about 50:1 are suitable but more appears unnecessary. Suitably the deoxygenating agent is mixed with the nitrobenzene compound and liquid anhydrous hydrogen fluoride in a pressure vessel, the atmosphere is displaced by carbon monoxide, the vessel is sealed and heated.

In the process of this invention, the deoxygenating agents act as oxygen acceptors and form oxidation products, for example, $POCl_3$, $SOCl_2$ and triphenyl phosphine oxide. The by-products are easily separated from the product fluoroanilines. The anhydrous hydrogen fluoride supplies hydrogen for conversion of the nitro group to $NH_2$ and supplies fluorine for substitution on the ring. It is important to maintain the hydrogen fluoride at least partly in the liquid phase and therefore the critical temperature of hydrogen fluoride at 230° C. should not be exceeded. The pressures are suitably from 15 to 3000 p.s.i.a.

The various deoxygenating agents vary in activity. The advantageous effects of carbon monoxide begin at about 100° C. and temperatures of about 100° to 230° C. are suitable. Preferably temperatures of about 150° to 200° C. are used.

The time required for the reaction also varies widely with different deoxygenating agents and satisfactory yields are obtained in from 1 to 10 hours or more.

Suitable nitrobenzenes for use as starting materials are nitrobenzene itself and substituted nitrobenzenes having as substituent at least one of methyl, chloro and nitro substituents. Examples of nitrobenzenes suitable as starting materials and of the fluoroanilines produced by the process of this invention include, but are not limited to the following:

| Nitrobenzene starting materials: | Fluoroaniline products |
|---|---|
| Nitrobenzene | p-Fluoroaniline. |
| m-Chloronitrobenzene | 3-chloro-4-fluoroaniline. |
| m-Nitrotoluene | 4-fluoro-3-toluidine. |
| o-Nitrotoluene | 4-fluoro-2-toluidine. |
| 2,5-dichloronitrobenzene | 2,5-dichloro-4-fluoroaniline. |
| m-Dinitrobenzene | 3-nitro-4-fluoroaniline. |
| o-Chloronitrobenzene | 2-chloro-4-fluoroaniline. |
| 4 - methyl - 1,3 - dinitrobenzene. | 5-nitro-4-fluoro-2-toluidine. |

Generally the fluorine substitutent takes the para position to a nitro group when that position is open and the product is a p-fluoroaniline.

Suitable deoxygenating agents include red or yellow elemental phosphorus, elemental sulfur in any of its allotropic forms, phosphorus and sulfur halides including the fluorides, chlorides, bromides and iodides of trivalent phosphorus and of sulfur lower in valence than 6. Suitable examples include $PF_3$, $PCl_3$, $S_2Cl_2$, $SCl_2$, $SCl_4$ and $S_2Br_2$. Suitable aryl phosphorous and sulfur halides include, for example, diphenyl phosphorus chloride, di-p-tolyl phosphorus chloride and benzene sulphenyl chloride. Suitable traryl phosphines include triphenyl phosphine, tri-o-tolyl phosphine, tri-p-tolyl phosphine and tri-p-bromophenylphosphine. Mixture of the deoxygenating agents are also suitable.

The minimum stoichiometric molar ratio of hydrogen fluoride to the nitrobenzene is 1:1. Less can be used, but the yields suffer. Generally, a molar ratio of hydrogen fluoride to the nitrobenzene of at least 1:1 is used and molar ratios up to 50:1 are suitable but more hydrogen fluoride can be used, if desired. Preferably molar ratios of from 10:1 to 30:1 are used.

After reaction is completed, the product is isolated in any convenient manner. For example, excess hydrogen fluoride is evaporated or distilled off. Water is added and the oxidation product together with unconverted deoxygenating agent both of which are usually insoluble in water, are filtered off or otherwise separated. The aqueous layer is made alkaline and the liberated anilines are separated and/or extracted with any suitable water immiscible organic solvent, for example, ether. The extract is dried and distilled to recover the fluoroaniline product.

It is an advantage of the process of this invention that no special purification of reagents is necessary since there are no catalysts to poison. A further advantage is that the amount of the aniline contaminant is usually considerably reduced. This is a significant improvement over the art and is particularly important since the anilines and the corresponding fluoroanilines frequently have closely similar boiling points and are only difficultly separable by distillation. For example, aniline and p-fluoroaniline boil at atmospheric pressure within about 3° C. of each other.

EXAMPLE I

A 300 ml. Hastelloy B rocking autoclave was charged with 12.3 g. (0.10 mole) of nitrobenzene, 3.1 g. (0.10 mole) of red phosphorus and 25 ml. (1.25 moles) of anhydrous liquid HF. The autoclave was pressured to 1250 p.s.i.g. with carbon monoxide. The mixture was heated to 150° C. at up to 2500 p.s.i.g. and maintained at that temperature for 5 hours. After cooling, the contents of the autoclave were discharged into a plastic beaker and most of the HF was evaporated using a nitrogen sparge. The residue was partitioned between water and ether, and insolubles were filtered off. The ether and water layers were separated, and the latter was made basic by slow addition of aqueous sodium hydroxide. The acid soluble material thus liberated was recovered by ether extraction. By vapor phase chromatography, the yield of total anilines was 64.6% of which 23.6 mole percent was p-fluoroaniline.

EXAMPLE II

A 300 ml. Hastelloy B rocking autoclave was charged with 6.15 g. (0.05 mole) of nitrobenzene, 13.1 g. (0.05 mole) of triphenylphosphine and 25 ml. (1.25 mole) of anhydrous liquid HF. The autoclave was pressured to 1200 p.s.i.g. with carbon monoxide. The mixture was heated to 150° C. under a maximum pressure of about 2500 p.s.i.g. and maintained at that temperature for three hours. After cooling, the contents of the autoclave were discharged into a plastic beaker and most of the HF was evaporated using a nitrogen sparge. The residue was partitioned between water and benzene. The water layer was separated and made basic by slow addition of aqueous sodium hydroxide. The acid soluble material thus liberated was recovered by either extraction. By vapor phase chromatography, the yield of total anilines was 41% of which 72% was p-fluoroaniline.

What is claimed is:

1. In a process for preparing a fluoroaniline which comprises heating at a temperature of from 100° to 230° C. under a pressure of 15 to 3000 p.s.i.a. a mixture of anhydrous hydrogen fluoride, a nitrobenzene selected from the group consisting of nitrobenzene and substituted nitrobenzenes having as substituent at least one of methyl, chloro and nitro substituents and a deoxygenating agent selected from the group consisting of elemental phosphorus, elemental sulfur, phosphorus trihalides, sulfur halides in which sulfur has a valence lower than 6, aryl phosphorous halides, aryl sulphenyl halides, and triaryl phosphines, the improvement of heating said reactants in an atmosphere containing a substantial proportion of carbon monoxide.

2. Process as claimed in claim 1 in which the molar ratio of said deoxygenating agent to said nitrobenzene is from 0.3:1 to 1:1 and the molar ratio of carbon monoxide to said deoxygenating agent is at least 0.5:1.

3. Process as claimed in claim 1 in which the molar ratio of said hydrogen fluoride to said nitrobenzene is at least 1:1.

4. Process as claimed in claim 1 in which said deoxygenating agent is triphenyl phosphine and the temperature is 120° to 170° C.

5. Process as claimed in claim 1 in which said nitrobenzene is nitrobenzene and said fluoroaniline is p-fluoroaniline.

6. Process as claimed in claim 1 in which said deoxygenating agent is red phosphorus.

References Cited

UNITED STATES PATENTS 3,293,295  12/1966  Swakon et al. _____ 260—580X
3,474,144  10/1969  Craig et al. _____ 260—580

ROBERT V. HINES, Primary Examiner

U.S. Cl. X.R.

260—646, 689, 694